(12) United States Patent
Tatsumoto et al.

(10) Patent No.: US 11,762,395 B2
(45) Date of Patent: Sep. 19, 2023

(54) SERVER, VEHICLE DISPATCH METHOD, AND NON-TRANSITORY COMPUTER-READABLE MEDIUM

(71) Applicant: TOYOTA JIDOSHA KABUSHIKI KAISHA, Toyota (JP)

(72) Inventors: Yuki Tatsumoto, Nagoya (JP); Saori Matsumoto, Chofu (JP); Keigo Yamada, Toyota (JP); Akira Sasaki, Miyoshi (JP); Mitsuhiro Miura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

(21) Appl. No.: 16/990,103

(22) Filed: Aug. 11, 2020

(65) Prior Publication Data
US 2021/0055742 A1 Feb. 25, 2021

(30) Foreign Application Priority Data
Aug. 19, 2019 (JP) .................. 2019-149776

(51) Int. Cl.
*G05D 1/02* (2020.01)

(52) U.S. Cl.
CPC ......... *G05D 1/0285* (2013.01); *G05D 1/0212* (2013.01)

(58) Field of Classification Search
CPC .................................................. G05D 1/0285
USPC ............................................................ 701/25
See application file for complete search history.

(56) References Cited

U.S. PATENT DOCUMENTS

| | | | |
|---|---|---|---|
| 2003/0177020 A1 | 9/2003 | Okamura | |
| 2019/0012613 A1* | 1/2019 | Ikeda | G06Q 10/02 |
| 2019/0094884 A1* | 3/2019 | Aitken | G06Q 10/047 |
| 2019/0113351 A1* | 4/2019 | Antony | B62D 1/00 |
| 2019/0180233 A1* | 6/2019 | Kadotani | G05D 1/0212 |
| 2020/0051194 A1* | 2/2020 | Park | G01G 19/12 |
| 2020/0159251 A1* | 5/2020 | Iwasaki | G08G 1/096805 |
| 2020/0283013 A1* | 9/2020 | Saito | B60W 60/00133 |
| 2020/0380630 A1* | 12/2020 | Fujihara | G06Q 50/30 |
| 2021/0088341 A1* | 3/2021 | MacNeille | G06Q 50/30 |
| 2021/0256847 A1* | 8/2021 | Kojo | G01C 21/3438 |
| 2021/0272463 A1* | 9/2021 | Jia | G06Q 50/30 |
| 2022/0194415 A1* | 6/2022 | Liu | G06F 16/9038 |

FOREIGN PATENT DOCUMENTS

| | | |
|---|---|---|
| JP | 2003-271706 A | 9/2003 |
| JP | 2019-016290 A | 1/2019 |
| JP | 2019-113347 A | 7/2019 |
| WO | 2017/223031 A1 | 12/2017 |

* cited by examiner

*Primary Examiner* — Yazan A Soofi
(74) *Attorney, Agent, or Firm* — Oliff PLC

(57) ABSTRACT

A server includes a controller configured to control operation of a vehicle, and a communication interface configured to communicate with a terminal apparatus held by a first user. The communication interface acquires, from the terminal apparatus, a list including a vehicle designation condition designated by the first user when the first user reserves boarding of a vehicle. The controller determines a vehicle to be boarded by the first user based on the list.

15 Claims, 4 Drawing Sheets

| | | |
|---|---|---|
| ALLOWABLE CONDITIONS | ■ | ALLOWABLE REGARDLESS OF AGE |
| | ☐ | ALLOWABLE REGARDLESS OF GENDER |
| | ■ | ALLOWABLE IF SEAT IS DISTANT FROM PASSENGER TO BE AVOIDED |
| | ☐ | ALLOWABLE REGARDLESS OF TRAVELING STATE |
| AVOIDANCE CONDITIONS | ■ | VEHICLE NOT WOMEN-ONLY CARRIAGE |
| | ☐ | SHARED WITH GROUP OF TWO OR MORE |
| | ☐ | SHARED WITH PERSON WITH INFANT |
| | ■ | SCORE REPRESENTING TRAVELING STATE IS LESS THAN PREDETERMINED VALUE |

SERVER, VEHICLE DISPATCH METHOD, AND NON-TRANSITORY COMPUTER-READABLE MEDIUM

CROSS-REFERENCE TO RELATED APPLICATIONS

The present application claims priority to Japanese patent application No. 2019-149776 filed on Aug. 19, 2019, the entire disclosure of which is incorporated herein by reference.

TECHNICAL FIELD

The present disclosure relates to a server, a vehicle dispatch method, and a non-transitory computer-readable medium.

BACKGROUND

Conventionally, vehicles that operate in response to a request from a user are known. For example, PTL 1 discloses a vehicle dispatch method that enables an improvement in operation efficiency.

CITATION LIST

Patent Literature

PTL 1: JP 2019-16290 A

SUMMARY

In the case where a plurality or users share a vehicle as passengers, it is desirable to improve the comfort of each of the users.

In view of this situation, an object of the present disclosure is to improve the comfort of passengers.

A server according to an embodiment of the present disclosure includes
a controller configured to control operation of a vehicle; and
a communication interface configured to communicate with a terminal apparatus held by a first user.
The communication interface acquires, from the terminal apparatus, a list including a vehicle designation condition designated by the first user when the first user reserves boarding of a vehicle, and
the controller determines a vehicle to be boarded by the first user based on the list.

A vehicle dispatch method according to one embodiment of the present disclosure includes
acquiring, from a terminal apparatus held by a first user, a list including a vehicle designation condition designated by the first user when the first user reserves boarding a vehicle, and
determining a vehicle to be boarded by the first user based on the list.

A non-transitory computer-readable medium according to one embodiment of the present disclosure stores a vehicle dispatch program for causing a processor to execute the steps of:
acquiring, from a terminal apparatus held by a first user, a list including a vehicle designation condition designated by the first user when the first user reserves boarding of a vehicle, and
determining a vehicle to be boarded by the first user based on the list.

According to the server, the vehicle dispatch method, and the non-transitory computer-readable medium according to an embodiment of the present disclosure, the comfort of the passengers can be improved.

BRIEF DESCRIPTION OF THE DRAWINGS

In the accompanying drawings.

DETAILED DESCRIPTION

Figure 1:
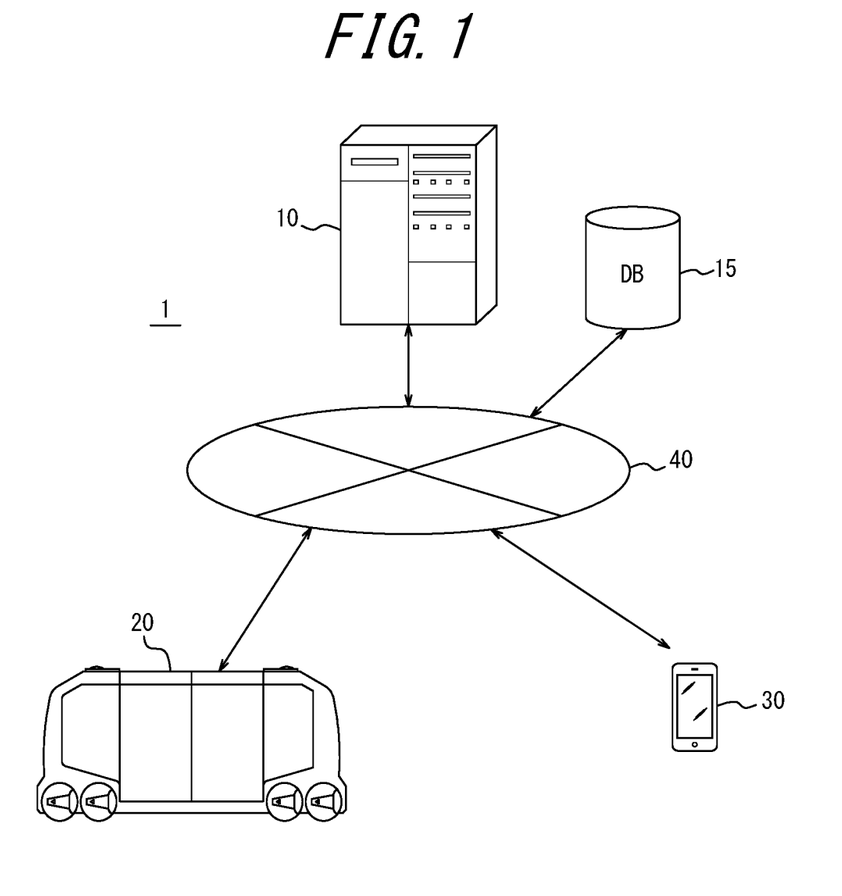
FIG. 1 is a schematic diagram illustrating an exemplary configuration of a vehicle dispatch system according to an embodiment.
Figure 2:
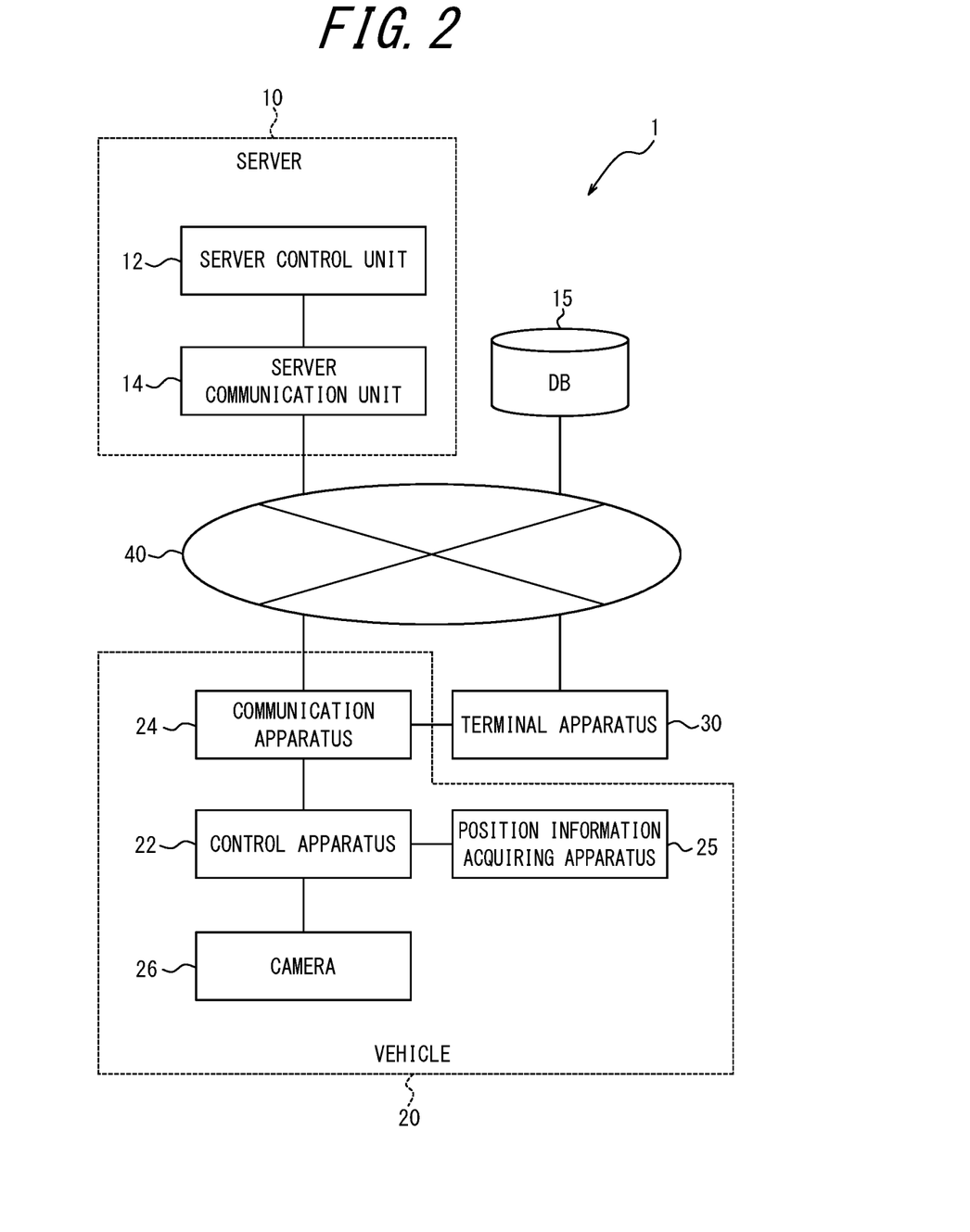
FIG. 2 is a block diagram illustrating an exemplary configuration of a vehicle dispatch system according to an embodiment.

As illustrated in FIGS. 1 and 2, a vehicle dispatch system 1 according to an embodiment includes a server 10, a vehicle 20, and a terminal apparatus 30. Although not essential, the vehicle dispatch system 1 also includes a database (DB) 15. The server 10, the vehicle 20, the terminal apparatus 30, and the DB 15 are connected to a network 40, and are able to communicate with each other. Each of the server 10, the vehicle 20, the terminal apparatus 30, and the DB 15 is not limited to one in number, and may be two or more.

The vehicle 20 operates with users on board. A user who boards the vehicle 20 is also referred to as a passenger. When a user desires to board the vehicle 20, the vehicle dispatch system 1 dispatches a vehicle 20 that the user is permitted to board, based on a reservation from the user. The vehicle dispatch system 1 may manage operation of the vehicle 20 such that the user can board the vehicle 20. The user has the terminal apparatus 30 and accesses the server 10 from the terminal apparatus 30 to reserve boarding of the vehicle 20. The server 10 receives the reservation from the user. The server 10 dispatches a vehicle 20 that the user is permitted to board, based on the reservation from the user. The server 10 may control an operation route or an operation schedule for the vehicle 20 that the user is permitted to board. The server 10 may determine whether a reservation from the user can be accepted, based on the operating state of the vehicle 20. The server 10 may determine the operation route or the operation schedule for the vehicle 20, based on the reservation state from the user. A service according to which the vehicle 20 is operated to permit a user to board, based on a reservation from the user, is also referred to as an on-demand bus service. The vehicle dispatch system 1 can provide an on-demand bus service.

The server 10 may include one or a plurality of server apparatuses which are able to communicate with each other. The server 10 may be operated by an entity that provides an on-demand bus service, for example. The server 10 manages boarding reservations for the vehicle 20 accepted from a user. The server 10 may transmit and receive various types of information related to the on-demand bus service to/from the vehicle 20. The server 10 may be configured so as to be able to execute not only such processing but also various types of processing related to the on-demand bus service. The server 10 manages operation of the vehicle 20. The server 10 may acquire, for example, various types of information regarding the vehicle 20, such as position or speed of the vehicle 20, through communication with the vehicle 20. The server 10 may be configured so as to be able to execute not only such processing but also various types of processing for managing the operation of the vehicle 20.

The server 10 includes a server controller 12 and a server communication interface 14. The server controller 12 may be simply referred to as a controller. The server controller 12 may include one or more processors. In the present embodiment, a "processor" may be, but is not limited to, a general-purpose processor, a processor dedicated to a particular process, or the like. The server controller 12 may include one or more dedicated circuits. A dedicated circuit may include a Field-Programmable Gate Array (FPGA) or an Application Specific Integrated Circuit (ASIC). The server controller 12 may include a dedicated circuit instead of a processor, or may include a dedicated circuit together with a processor.

The server communication interface 14 may be simply referred to as a communication interface. The server communication interface 14 may include a communication module and may communicate with the vehicle 20. The server 10 may also include a memory. The memory may be a semiconductor memory, a magnetic memory, an optical memory, or the like, but is not limited thereto. The memory may function as a main memory, an auxiliary memory, or a cache memory. The memory may include an electromagnetic storage medium such as a magnetic disk. The memory may include a non-transitory computer-readable medium. The memory stores any information to be used for operation of the server 10. For example, the memory may store a system program, an application program, or the like. The server 10 may store a program, information, or the like, by using the DB 15 as a memory. The memory may be included in the server controller 12.

The vehicle 20 is a vehicle for passenger transportation such as a bus used for an on-demand bus service, for example, but is not limited thereto. The vehicle 20 may be any vehicle that can be used by a user as a passenger. The vehicle 20 is not limited to one in number but may be two or more. The vehicle 20 may be a vehicle that is operable by automatic operation. Automatic operation may be performed, for example, at any level from level 1 to level 5 as specified by the Society of Automotive Engineers (SAE). The automatic operation may be performed based on another specification, without being limited to the specification mentioned as an example.

The vehicle 20 is equipped with a control apparatus 22, a communication apparatus 24, and a camera 26. The control apparatus 22, the communication apparatus 24, and the camera 26 are communicably connected with each other via an in-vehicle network such as a controller area network (CAN) or a dedicated network.

The control apparatus 22 controls the respective constituent units provided in the vehicle 20. The control apparatus 22 may include one or more processors. The control apparatus 22 may include one or more dedicated circuits instead of a processor or may include one or more dedicated circuits together with a processor. The control apparatus 22 may further includes a memory.

The communication apparatus 24 communicates with the server 10 via the network 40. The communication apparatus 24 may communicate with the terminal apparatus 30 via the network 40 or communicate with the terminal apparatus 30 not via the network 40. The communication apparatus 24 may be an in-vehicle communication device, for example. The communication apparatus 24 may include a communication module that connects to the network 40. The communication module may include a communication module conforming to a mobile communication standard such as the 4th Generation (4G) standard, the 5th Generation (5G) standard, or the like, but is not limited thereto.

The camera 26 captures persons or objects existing around the vehicle 20. The camera 26 may include an imaging device that images visible light, or may include an imaging device that images electromagnetic waves other than visible light such as infrared light. An image captured by the camera 26 is also referred to as an in-vehicle camera image. The vehicle 20 may transmit an in-vehicle camera image to the server 10 using the communication apparatus 24.

Although not essential, the vehicle 20 also includes a position information acquiring apparatus 25. The position information acquiring apparatus 25 is connected with other constituent units equipped to the vehicle 20 via an on-vehicle network such as CAN or a dedicated network. The position information acquiring apparatus 25 acquires position information for the vehicle 20. The position information acquiring apparatus 25 may include a receiver supporting a satellite positioning system. A receiver supporting a satellite positioning system may be a global positioning system (GPS) receiver, for example. In the present embodiment, the vehicle 20 can acquire the position information for the vehicle 20 itself by using the position information acquiring apparatus 25. The vehicle 20 may output the position information for the vehicle 20 itself to the server 10 or the terminal apparatus 30.

The terminal apparatus 30 communicates with the vehicle 20 via the network 40 or not via the network 40. The terminal apparatus 30 communicates with the server 10 via the network 40. The terminal apparatus 30 may be a mobile terminal such as a smartphone, for example.

The terminal apparatus 30 may run an application used for reservation of the vehicle 20 by a user. The terminal apparatus 30 may communicate with the server 10 and transmit and receive information regarding a boarding reservation made by a user. Information regarding a boarding reservation made by a user is also referred to as reservation information. The terminal apparatus 30 may allow a user to input reservation information through the application.

The terminal apparatus 30 may have, for example, a configuration identical or similar to that of the position information acquiring apparatus 25 provided to the vehicle 20 to thereby acquire position information for the terminal apparatus 30 itself. The terminal apparatus 30 may output the position information for the terminal apparatus 30 itself to the server 10 or the vehicle 20.

Vehicle Selection Based on Reservation Information

The server communication interface 14 of the server 10 acquires reservation information from the terminal apparatus 30. The server controller 12 of the server 10 selects the vehicle 20 that the user is permitted to board, based on the reservation information. The server controller 12 determines the vehicle 20 that the user is permitted to board and dispatches the vehicle for the user to board. The server controller 12 updates operation information for the vehicle 20 to be dispatched for the user to board, and controls operation of the vehicle 20.

Point and Time Designation

The reservation information includes information designating a point where a user is to board the vehicle 20 and a point where the user is to alight the vehicle 20. The reservation information includes information designating at least one of a time at which a user is to board the vehicle 20 and a time at which the user is to alight the vehicle 20. A point where the user is to board the vehicle 20 is also referred to as a boarding point. A point where the user is to alight the vehicle 20 is also referred to as an alighting point. The time at which the user is to board the vehicle 20 is also referred to as a boarding time. The time at which the user is to alight the vehicle 20 is also referred to as an alighting time.

The boarding point and the alighting point may be designated by information representing specific points. For example, the boarding point and the alighting point may be designated by an address or latitude/longitude.

In a case in which the boarding point and the alighting point are designated as pinpoints or designated in a narrow range, selection of a vehicle 20 that can be dispatched may be difficult. The boarding point and the alighting point may be designated by information indicating an allowable range as points where the user can actually board and alight. For example, information designating the boarding point and the alighting point may include information indicating how far the points where the user actually gets on or gets off the vehicle 20 are allowed to be separated from the points designated by the user. Specifically, a distance allowable by the user as a distance to an actual boarding point or an actual alighting point, as seen from the points designated by the user, may be designated. Furthermore, in the case in which a point, moving along a predetermined path from a point designated by the user, is an actual boarding point or alighting point, a distance allowable by the user as a moving distance from the designated point may be designated.

The boarding point and the alighting point may be designated by information indicating a predetermined range. The predetermined range may be designated by an address, for example. The predetermined range may be designated by a boundary specifying the range. The boundary may be designated as a line linking a plurality of points. The predetermined rage may be designated as a range along a predetermined path.

The boarding time and the alighting time may be designated as specific times. In a case in which the boarding time and the alighting time are designated as pinpoints or designated in a narrow range, selection of vehicle 20 that can be dispatched may be difficult. The boarding time and the alighting time may be designated by information indicating an allowable range as times when the user can actually board or alight. For example, information designating the boarding time and the alighting time may include information indicating how much the time when the user actually gets on or gets off the vehicle 20 is allowed to be earlier or later than the time designated by the user. Specifically, a time range that is allowable by the user with respect to the time designated by the user may be designated.

The boarding time and the get-off time may be designated as a predetermined time period. A predetermined time period may be designated as a time period between the earliest time and the latest time that are allowable by the user.

The server controller 12 selects a vehicle 20 that can be dispatched in accordance with the reservation made by the user, based on the boarding point and the alighting point designated by the user. The server controller 12 may select the vehicle 20 scheduled to operate according to a route passing through the boarding point and the alighting point designated by the user. The server controller 12 selects a vehicle 20 that can be dispatched in accordance with the reservation made by the user, based on at least one of the boarding time and the alighting time designated by the user. The server controller 12 may select a vehicle 20 scheduled to operate according to a route passing through the boarding point at the boarding time designated by the user or the alighting point at the alighting time designated by the user.

The server controller 12 designates the boarding point and the boarding time and the alighting point and the alighting time for the user if the user boards the selected vehicle 20. When the user designates the boarding time but does not designate the alighting time, the server controller 12 may designate the alighting time for the user based on the operating state of the selected vehicle 20. When the user designates the alighting time but does not designate the boarding time, the server controller 12 may designate the boarding time for the user based on the operating state of the selected vehicle 20.

Operating Condition Designation

The vehicle 20 operates under various conditions. For example, the vehicle 20 operates with a plurality of passengers sharing the vehicle, or operates according to various routes. The conditions under which the vehicle 20 operates are also referred to as operation conditions. The vehicle dispatch system 1 is configured such that a user can make a reservation while also designating operation conditions. The reservation information, at the time the reservation is made by the user, also includes information designating operation conditions. Operation conditions designated at the time the reservation is made by a user are also referred to as vehicle designation conditions. When inputting reservation information to the terminal apparatus 30, a user also inputs vehicle designation conditions. The server communication interface 14 acquires reservation information including the vehicle designation conditions from the terminal apparatus 30. The server controller 12 additionally selects a vehicle 20 that can be dispatched in accordance with the reservation made by the user, based on the vehicle designation conditions.

The reservation information also includes vehicle designation conditions. The vehicle designation conditions may include a condition allowable by a user as an operation condition for the vehicle 20. A condition allowable by a user as an operation condition for the vehicle 20 is also referred to as an allowable condition. The vehicle designation conditions may include a condition that a user desires to avoid as an operation condition for the vehicle 20. A condition that a user desires to avoid as an operation condition for the vehicle 20 is also referred to as an avoidance condition. The vehicle designation conditions may be expressed as a list containing a plurality of conditions. A list containing allowable conditions is also referred to as a positive list or a whitelist. A list containing avoidance conditions is also referred to as a negative list or a blacklist. The vehicle designation conditions may include a condition essential for a user as an operation condition for the vehicle 20. A condition essential for a user as an operation condition for the vehicle 20 is also referred to as a mandatory condition. A mandatory condition can be expressed in a form that denies an avoidance condition.

The server controller 12 additionally selects the vehicle 20 that can be dispatched in accordance with the reservation made by the user, based on the vehicle designation conditions. Examples of the vehicle designation conditions will be described later.

The server controller 12 may output information regarding the selected vehicle 20 from the server communication interface 14 to the terminal apparatus 30 of the user to inform the user. In the case in which the user is to board the selected vehicle 20, the information regarding the selected vehicle 20 includes the boarding point and the boarding time, and the alighting point and the alighting time of the user. The terminal apparatus 30 may receive an operation for accepting boarding of the selected vehicle 20 by the user. When the user accepts boarding of the selected vehicle 20, the server controller 12 may dispatch the vehicle 20 to allow the user to board the selected vehicle 20.

Vehicle Designation Condition Examples

Figure 3:
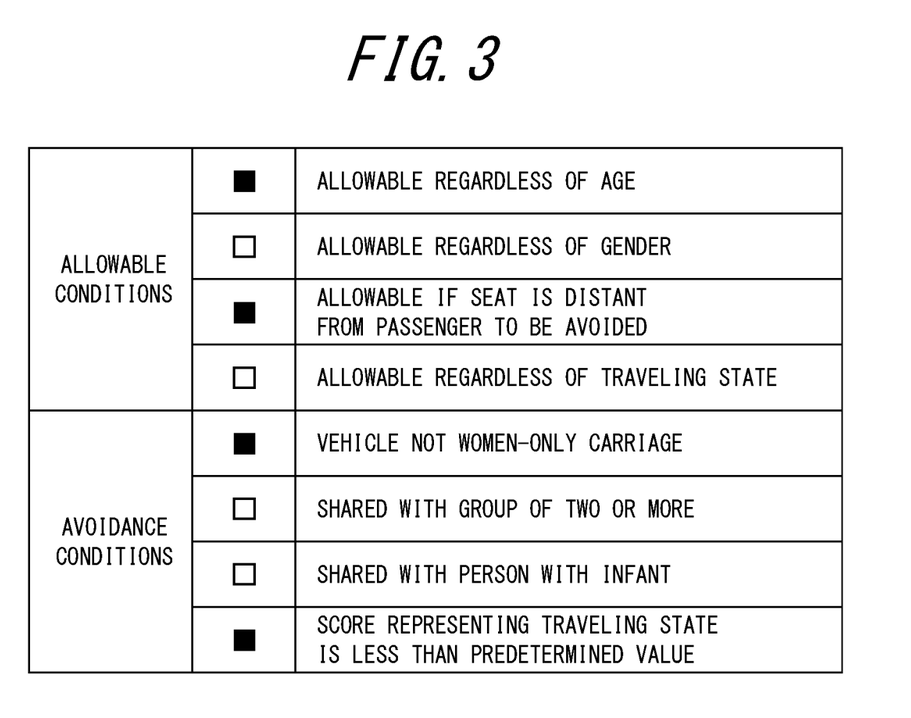
FIG. 3 is a table illustrating an exemplary list for designating vehicle designation conditions.

As illustrated in FIG. 3, the vehicle designation conditions may be expressed as a list including a plurality of conditions. The vehicle designation conditions may include a condition designated as an allowable condition. The vehicle designation conditions may include a condition designated as an avoidance condition. The vehicle designation conditions may include a condition designated as a mandatory condition. As described above, the vehicle designation conditions may include a condition designating accompanying passengers who will share the vehicle 20, or a condition designating a traveling state of the vehicle 20.

Accompanying Passenger Designation

In the case where a plurality of passengers are to share the vehicle 20, a user may designate a condition on other accompanying passengers who share the vehicle 20 as a vehicle designation condition. A user who reserves boarding of the vehicle 20 is also referred to as a first user. Another passenger who is an accompanying passenger sharing the vehicle 20 is also referred to as a second user. The first user may designate a condition for a passenger allowable as a second user, as an allowable condition. The first user may designate a condition for a passenger that the first user desires to avoid as a second user, as an avoidance condition.

A first user may designate a condition specifying another passenger as an individual by name or the like, as an allowable condition or an avoidance condition, or a mandatory condition. A first user may designate a condition specifying another passenger by an attribute such as age, gender, or the like, as an allowable condition, an avoidance condition, or a mandatory condition. A first user may designate a condition specifying whether another passenger boards the vehicle alone or as a group of two or more persons, as an allowable condition or an avoidance condition, or a mandatory condition.

A first user may designate a passenger in an age group different from that of the first user as an avoidance condition. In that case, the first user may designate that a passenger in an age group different from that of the first user is not included as a second user, as a mandatory condition. The first user may designate a group with infants as an avoidance condition. In that case, the first user may designate that an infant is not included as a second user, as a mandatory condition. The first user may designate a group of two or more persons as an avoidance condition. In that case, the first user may designate that every second user boards the vehicle alone, as a mandatory condition. The first user may designate a group of two or more minors as an avoidance condition. In that case, the first user may designate that a group including two or more minors does not share the vehicle as second users, as a mandatory condition. For example, in the case where a user is a woman, the user may designate that the vehicle 20 is a women-only carriage as a mandatory condition. In that case, the user may designate that the vehicle 20 is not a women-only carriage as an avoidance condition.

A first user may designate that another passenger is allowed to be a second user regardless of age, as an allowable condition. A first user may designate that another passenger is allowed to be a second user regardless of gender, as an allowable condition. A first user may designate, as an allowable condition, to allow a passenger who seats away from the first user in the vehicle 20 to be a second user although he/she is a passenger who falls under the avoidance condition.

As described above, the server controller 12 additionally selects the vehicle 20 that can be dispatched in accordance with the reservation made by the user, based on the vehicle designation conditions. In the case where a vehicle designation condition is expressed as a comparison with an attribute of the first user, the terminal apparatus 30 causes the first user to input attribute of the first user, and outputs it to the server controller 12 via the server communication interface 14 as reservation information.

As described above, in the vehicle dispatch system 1 according to the present embodiment, when a plurality of passengers share the vehicle 20, the respective passengers satisfy the conditions required for the other passengers, whereby the in-vehicle environment can be improved. As a result, the comfort of the respective passengers can be improved.

The vehicle 20 may be provided with a partition such as a curtain to divide the cabin into at least a first area and a second area. When a first user boards to the first area, the server controller 12 may handle the passengers boarding to the same first area as first users, as determination targets based on the list including the vehicle designation conditions. The server controller 12 may not handle the passengers boarding to the second area that is different from the area of the first user, as determination targets to be based on the list including the vehicle designation conditions. In this way, it is possible to increase the number of vehicles 20 that can be selected based on the reservation information from the user. As a result, the convenience for the users is improved, and the operation efficiency of the vehicles 20 is also improved.

Traveling State Designation

In the case where the vehicle 20 operates according to various routes, the vehicle 20 may travel in various states. For example, when a user boards the vehicle 20 that travels a flat and straight road at a constant speed, the user feels comfortable in the vehicle environment. On the other hand, when the vehicle 20 operates on a route with many curves and undulations, for example, the user may feel stress due to the accelerations applied to the vehicle 20. For example, in the case where the vehicle 20 operates on a route with many traffic signals and traffic volume so that stops and starts are frequently repeated, the user may feel stress due to the accelerations applied to the vehicle 20. For example, when the vehicle 20 is loud while traveling or when the area where the vehicle 20 is traveling is loud, the user may feel stress due to the loud sounds. The user may designate a condition regarding the traveling state of the vehicle 20 as a vehicle designation condition. The user may designate a condition regarding an allowable traveling state as an allowable condition for boarding. The user may designate a condition regarding a traveling state that the user desires to avoid as an avoidance condition for boarding.

The traveling state of the vehicle 20 may be identified by a difference in elevation of the operation route, for example. The traveling state of the vehicle 20 may be identified by the number of curves included in the operation route or the curvatures of the curves. The traveling state of the vehicle 20 may be identified by a road surface condition for the operation route. The road surface condition for the operation route may include unevenness on the road surface, frictional coefficient of the road surface, or the like. The traveling state of the vehicle 20 may be identified by the number of traffic signals included in the operation route. The traveling state of the vehicle 20 may be identified by the traffic volume on the operation route.

The traveling state of the vehicle 20 may be expressed as a score. The score representing the traveling state of the vehicle 20 is also referred to as a traveling state score. The traveling state score may be calculated based on a change in acceleration of the vehicle 20, loudness at the time of traveling of the vehicle 20, sounds in the traveling area of the vehicle 20, or the like. As the stress on the passengers of the vehicle 20 increases, the traveling state score may be calculated as a smaller value or may be calculated as a larger value. In the present embodiment, as the stress on the passengers of the vehicle 20 increases, the traveling state score is calculated as a smaller value. A user may designate that the traveling state score is less than a predetermined value, as an avoidance condition. In that case, the user may designate that the traveling state score is equal to or larger than a predetermined value as a mandatory condition.

As described above, the vehicle dispatch system 1 according to the present embodiment can satisfy the conditions desired for the traveling state of the vehicle 20 by the first user. Consequently, convenience for the user is improved.

When a reservation of the vehicle 20 by a first user is established, the server controller 12 may give an incentive to the first user. The incentive may be given in the form of a reduction of the fare for the vehicle 20 to the first user. The incentive may be given as points which can be applied as payment for fares of the vehicle 20. The incentive may be given as electronic money. The incentive may be given as points exchangeable for valuables or pay services.

The server controller 12 may determine the size of an incentive based on a list included in the reservation information input by the first user. For example, the server controller 12 may increase the incentive to be given to the user as the number of vehicles 20 selected based on the list is larger. The server controller 12 may increase the incentive to be given to the user, as the number of allowable conditions included in the list is larger. The server controller 12 may increase the incentive to be given to the user, as the number of avoidance conditions or mandatory conditions included in the list is smaller.

By giving an incentive to the first user, it may be possible to avoid the vehicle designation conditions from becoming overly restrictive. Consequently, the operation efficiency of the vehicles 20 is improved.

The terminal apparatus 30 may display a list illustrated as an example in FIG. 3, and allow a user to check the check boxes of the items that the user desires to apply as vehicle designation conditions. With this configuration, a user can easily set the vehicle designation conditions. In the example of FIG. 3, the items for which the check boxes are black are assumed to be applied as vehicle designation conditions. Also, the items for which the check boxes are white are assumed not to be applied as vehicle designation conditions.

For example, an allowable condition that allows another passenger as a second user regardless of gender is a condition contradicting an avoidance condition that the vehicle 20 is not a women-only carriage. In that case, the terminal apparatus 30 may control the check boxes such that both of the contradictory conditions are not applied. For example, when one check box of the contradictory conditions is checked, the terminal apparatus 30 may release the check in the other check box. With this configuration, a user can easily set the vehicle designation conditions.

Vehicle Dispatch Method Example

Figure 4:
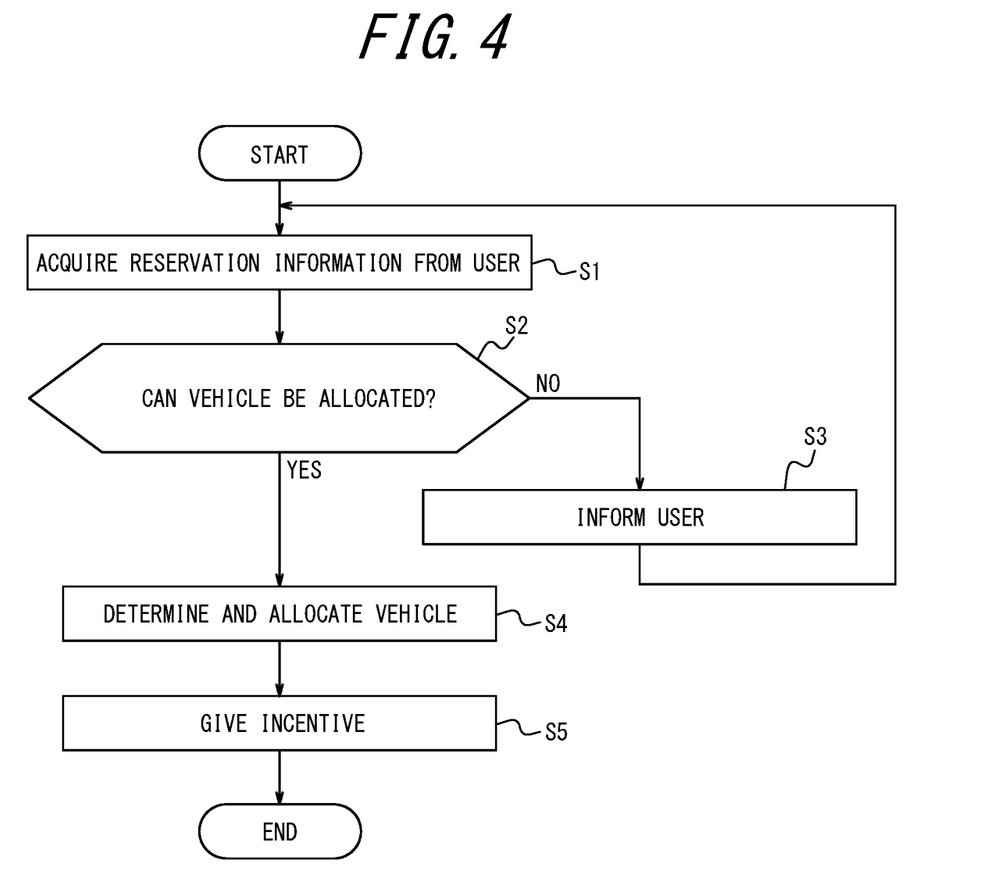
FIG. 4 is a flowchart illustrating exemplary procedures executed by a server.

The server 10 included in the vehicle dispatch system 1 may perform a vehicle dispatch method including the procedures of the flowchart illustrated in FIG. 4. The vehicle dispatch method may be realized as a vehicle dispatch program to be executed by a processor such as the server controller 12. The vehicle dispatch program may be stored on a non-transitory computer-readable medium.

The server controller 12 acquires reservation information from the terminal apparatus 30 of a user using the server communication interface 14 (step S1). A user is able to apply to board the vehicle 20 by operating the terminal apparatus 30 held by the user to input reservation information. The terminal apparatus 30 outputs the reservation information input by the user to the server 10. The terminal apparatus 30 allows the user to designate a boarding point and an alighting point. The terminal apparatus 30 allows the user to designate at least one of the boarding time and the alighting time. The terminal apparatus 30 may allow the user to input the attribute information of the user itself. The terminal apparatus 30 may allow the user to input information regarding vehicle designation conditions. The terminal apparatus 30 generates reservation information including the information input by the user, and outputs it to the server 10. The server controller 12 may register the user as a member in advance, and store information regarding the attribute of the registered user. The server controller 12 may accept boarding reservations for the vehicle 20 only from the users registered as members. The server controller 12 may accept reservation of the users registered as members preferentially.

The server controller 12 determines whether the vehicle 20 can be dispatched (step S2). The server controller 12 selects the vehicle 20 that can be dispatched based on the boarding point and the alighting point designated by the user. The server controller 12 selects the vehicle 20 that can be dispatched based on at least one of the boarding time and the alighting time designated by the user. The server controller 12 selects the vehicle 20 that can be dispatched based on the vehicle designation conditions as well. When at least one vehicle 20 can be selected as the vehicle 20 satisfying the conditions designated in the reservation information input by the user, the server controller 12 determines that the vehicle 20 satisfying the conditions designated in the reservation information can be dispatched. When no vehicle 20 satisfying the conditions designated in the reservation information can be selected, the server controller 12 determines that a vehicle 20 satisfying the conditions designated in the reservation information cannot be dispatched.

When the server controller 12 determines that a vehicle 20 cannot be dispatched (step S2: NO), the server controller 12 informs the user that no vehicle can be dispatched (step S3). The server controller 12 outputs an indication that no vehicle can be dispatched to the terminal apparatus 30 of the user from the server communication interface 14. The terminal apparatus 30 informs the user that no vehicle can be dispatched. The server controller 12 may inform that a vehicle 20 satisfying the conditions designated in the reservation information cannot be dispatched. The server controller 12 may inform that a vehicle 20 may be dispatched if a specific condition included in the conditions designated in the reservation information is removed or changed. The user may change the setting of the conditions designated in the reservation information, based on the information. After performing the procedure of step S3, the server controller 12 returns to the procedure of step S1 to acquire reservation information including the conditions changed by the user.

When the server controller 12 determines that a vehicle 20 can be dispatched (step S2: YES), the server controller 12 determines a vehicle 20 that the user is permitted to board, and dispatches it (step S4). The server controller 12 may output an indication that the vehicle 20 that the user is permitted to board has been determined, from the server communication interface 14 to the terminal apparatus 30 of the user. The server controller 12 may output information designating the boarding point or the boarding time for the user from the server communication interface 14 to the terminal apparatus 30. The terminal apparatus 30 may inform the user of information designating the boarding point and the boarding time for the user. The server controller 12 may output information regarding the selected vehicle 20 from the server communication interface 14 to the terminal apparatus 30 of the user to inform the user. Information regarding the selected vehicle 20 includes the boarding point and the boarding time and the alighting point and the alighting time for the user in the case that the user boards the selected vehicle 20. The terminal apparatus 30 may accept an operation by the user to accept boarding of the selected vehicle 20. When the user accepts boarding of the selected vehicle 20, the server controller 12 may dispatch the vehicle 20 to permit the user to board the selected vehicle 20. When the vehicle 20 is dispatched, the server controller 12 may update the operation information for the vehicle 20 to thereby control operation of the vehicle 20.

The server controller 12 gives an incentive to the user (step S5). The server controller 12 may output, from the server communication interface 14 to the terminal apparatus 30, information for informing the user that an incentive has been given. The server controller 12 may determine the size of the incentive based on the vehicle designation conditions. If the user accepts a proposal to remove or change the vehicle designation conditions informed to the user in the procedure of step S3, the server controller 12 may add the incentive. After execution of the procedure of step S5, the server controller 12 ends the procedures of the flowchart of FIG. 4.

As described above, when the server controller 12 according to the present embodiment executes the vehicle dispatch method or the vehicle dispatch program, in the case in which a plurality of passengers share the vehicle 20, conditions desired by the respective passengers in relation to other passengers are satisfied, whereby the in-vehicle environment can be improved. As a result, the comfort of each of the passengers can be improved.

While an embodiment according to the present disclosure has been described based on the drawings and examples, it should be noted that various modifications and corrections can be easily made based on the present disclosure by those skilled in the art. Therefore, it should be noted that those modifications and revisions are included in the scope of the present disclosure. For example, the functions and the like included in the respective means or respective steps can be rearranged so as not to contradict logically, and a plurality of means, steps, or the like can be combined into one or can be divided.

The invention claimed is:

1. A server comprising:
a controller configured to control operation of a vehicle; and
a communication interface configured to communicate with a terminal apparatus held by a first user, wherein
the communication interface acquires, from the terminal apparatus, a list including a vehicle designation condition designated by the first user, when the first user reserves boarding of a vehicle, the vehicle designation condition including a vehicle condition for a second user who is to share the vehicle to be boarded by the first user, and
the controller determines a vehicle to be boarded by the first user based on the list.

2. The server according to claim 1, wherein the condition for the second user includes an attribute such as age or gender of the second user.

3. The server according to claim 1, wherein the condition for the second user includes whether the second user boards the vehicle alone or as a group of two or more persons.

4. The server according to claim 1, wherein the condition for the second user includes whether the second user boards the vehicle with an infant.

5. The server according to claim 1, wherein the vehicle includes a cabin divided into at least a first area and a second area, and
in a case where the first user will board to the first area, the controller determines the vehicle to be boarded by the first user based on the list when the second user will also board to the first area, but will not determine the vehicle to be boarded by the first user based on the list when the second user will board to the second area.

6. The server according to claim 1, wherein the condition for the second user is an avoidance condition indicating a quality of a type of second user that should be avoided.

7. The server according to claim 1, wherein the controller gives an incentive to the first user based on the list.

8. A vehicle dispatch method comprising:
controlling operation of the vehicle;
acquiring, from a terminal apparatus held by a first user, a list including a vehicle designation condition designated by the first user when the first user reserves boarding of a vehicle, the vehicle designation condition including a vehicle condition for a second user who is to share the vehicle to be boarded by the first user; and
determining a vehicle to be boarded by the first user based on the list.

9. The vehicle dispatch method according to claim 8, further comprising giving an incentive to the first user based on the list.

10. A non-transitory computer-readable medium storing a vehicle dispatch program for causing a processor to execute the steps of:
controlling operation of the vehicle;
acquiring, from a terminal apparatus held by a first user, a list including a vehicle designation condition designated by the first user when the first user reserves boarding of a vehicle, the vehicle designation including a vehicle condition for a second user who is to share the vehicle to be boarded by the first user; and
determining a vehicle to be boarded by the first user based on the list.

11. The non-transitory computer-readable medium according to claim 10, wherein the vehicle dispatch program causes the processor to further execute the step of giving an incentive to the first user based on the list.

12. The server according to claim 1, wherein
the vehicle designation condition includes a traveling state of the vehicle, and
the traveling state of the vehicle is identified by a number of curves included in an operation route of the vehicle or curvatures of the curves.

13. The server according to claim 1, wherein
the vehicle designation condition includes a traveling state of the vehicle, and the traveling state of the vehicle is identified by a road surface condition for an operation route.

14. The server according to claim 13, wherein the road surface condition for the operation route includes unevenness on the road surface and a frictional coefficient of the road surface.

15. The server according to claim 1, wherein
the vehicle designation condition includes a traveling state of the vehicle, and
the traveling state of the vehicle is identified by a number of traffic signals included in an operation route or a traffic volume on an operation route.

* * * * *